(12) United States Patent
Voigt et al.

(10) Patent No.: US 7,190,097 B2
(45) Date of Patent: *Mar. 13, 2007

(54) CROSS PLANE WIDE-GAP MOTOR SYSTEM FOR GIMBAL

(76) Inventors: Che Ram Souza Voigt, 505 Divisadero St. #B2, San Francisco, CA (US) 94117; Allan Alfred Voigt, 400 Breezewood Dr., Geyserville, CA (US) 95441; John Mark Speicher, 133 Rossi, Geyserville, CA (US) 95441; Chet Alister Johnston, 536 Spencer Ave., Santa Rosa, CA (US) 95404

( * ) Notice: Subject to any disclaimer, the term of this patent is extended or adjusted under 35 U.S.C. 154(b) by 0 days.

This patent is subject to a terminal disclaimer.

(21) Appl. No.: 11/014,091

(22) Filed: Dec. 15, 2004

(65) Prior Publication Data

US 2005/0225189 A1    Oct. 13, 2005

(51) Int. Cl.
  *G01C 19/24* (2006.01)
  *G01B 39/00* (2006.01)
(52) U.S. Cl. .......................... 310/112; 396/13; 74/5.47; 74/5.7
(58) Field of Classification Search ............ 310/12–15, 310/90.5, 112; 74/5.46–5.47, 5.7; 396/12, 396/13
See application file for complete search history.

(56) References Cited

U.S. PATENT DOCUMENTS

| | | | | |
|---|---|---|---|---|
| 2,850,905 A | * | 9/1958 | Sedgfield | 74/5.7 |
| 2,971,384 A | * | 2/1961 | Johnston | 74/5.7 |
| 3,017,777 A | * | 1/1962 | Curriston | 74/5.46 |
| 3,611,785 A | * | 10/1971 | Hanson | 73/1.75 |
| 3,775,656 A | * | 11/1973 | Romans | 318/649 |
| 4,036,453 A | * | 7/1977 | Evans et al. | 244/3.16 |
| 4,325,586 A | * | 4/1982 | Hubert et al. | 310/90.5 |
| 4,470,644 A | * | 9/1984 | Weisser | 310/90.5 |
| 4,498,038 A | * | 2/1985 | Malueg | 318/648 |
| 4,610,172 A | * | 9/1986 | Mickle et al. | 74/5.46 |
| 4,714,214 A | * | 12/1987 | Schleimann-Jensen et al. | 244/3.16 |
| 4,828,376 A | * | 5/1989 | Padera | 359/555 |
| 4,908,558 A | * | 3/1990 | Lordo et al. | 318/648 |
| 4,973,145 A | * | 11/1990 | Kirkwood et al. | 359/872 |
| 5,386,738 A | * | 2/1995 | Havenhill | 74/5.22 |
| 5,791,591 A | * | 8/1998 | Hoban | 244/3.16 |
| 5,868,031 A | * | 2/1999 | Kokush et al. | 74/5.34 |

(Continued)

*Primary Examiner*—Burton Mullins
(74) *Attorney, Agent, or Firm*—Risto A. Rinne, Jr.

(57) ABSTRACT

An apparatus for the control and alignment of a sensor on a moving vehicle is provided that includes a gimbal ball supported by an outer axis structure and adapted to pivot about an outer elevation axis and about an outer azimuth axis. The outer axis structure is mounted to a vehicle. An inner axis structure includes a cardan shaft that is provided in the ball and is used to support a payload. An inner elevation axis passes through the cardan shaft. The payload is moved about inner pitch inner roll and inner yaw axes over a limited range of motion by the use of a plurality of permanent magnet wide-gap motors that are disposed on the plane of the cardan shaft and maximally away from the yaw axis in the ball. The motors are adapted to each urge the payload to move in two perpendicular axes, depending upon the current that is applied through conductors which pass through a flux field. Control circuitry is used to energize the motors in any desired combination to produce motion in roll, pitch, or yaw.

28 Claims, 3 Drawing Sheets

U.S. PATENT DOCUMENTS 5,897,223 A * 4/1999 Tritchew et al. ............... 396/13
6,145,393 A * 11/2000 Canton ....................... 74/5.43
6,154,317 A * 11/2000 Segerstrom et al. ........ 359/554
6,263,160 B1 * 7/2001 Lewis ......................... 396/13
6,326,714 B1 * 12/2001 Bandera ................. 310/156.38
6,370,329 B1 * 4/2002 Teuchert ........................ 396/7

* cited by examiner

CROSS PLANE WIDE-GAP MOTOR SYSTEM FOR GIMBAL

RELATED APPLICATIONS

This application is related to utility patent application "Cardan Support" Ser. No. 09/837,248 filed Apr. 18, 2001 which issued as U.S. Pat. No. 6,484,978 on Nov. 26, 2002, and "Offset Cardan Gimbal" Ser. No. 09/837,247 also filed Apr. 18, 2001 which issued as U.S. Pat. No. 6,454,229 on Sep. 24, 2002. The specification of these patents is included by reference herein.

BACKGROUND OF THE INVENTION

1. Field of the Invention

The present invention, in general, relates to gimbals and, more particularly, to permanent magnet wide-gap motors that are used to move the gimbal payload about its inner axes.

Gimbals are commonly used to hold sensors stable when mounted on a moving vehicle, be it a land based vehicle, a sea (i.e., a water based) vehicle such as a boat or ship, or an air based vehicle such as an airplane.

The ability to hold a sensor stable while the vehicle moves is useful for a great variety of purposes. These purposes include obtaining information useful for navigation. Another purpose relates in general to an ability to align and then to hold the sensors where desired. All manner of sensors may be used, for example, television cameras as well as other sensors that use any preferred technology. Whatever information is being provided by the sensors is more reliable if the sensors themselves are held steady.

In general, gimbals have a plurality of outer axes and a plurality of inner axes. Course adjustments are commonly accomplished by movements made along the outer axes. Finer adjustments are commonly made with the inner axes.

There are a number of discreet functions a gimbal must achieve. It must both properly orient, maintain position, and support the size and weight of the sensors. This can vary from application to application.

The sensors are placed inside of a gimbal shell along with numerous other component parts that are used to orient the gimbal ball as required. The gimbal shell is often in the general shape of a ball and is therefore sometimes also referred to as a gimbal ball or simply a ball. In general, for any given size of the gimbal shell, the space (i.e., volume) that is available for the sensors is limited and a more usable volume is desirable. Accordingly, it is desirable to locate the motors that move the payload within the ball (i.e., the inner axes) as far away from the center payload area as possible. Another way of stating this objective is to locate the motors in a space that is not well used by sensors.

Gimbals often include a cardan assembly that is disposed within a ball. The cardan assembly supports the weight of the payload that is carried by the gimbal as well as allowing small rotational movements (inner axis motion) that affect the positioning of the payload within the ball.

These changes in position are accomplished by rotating the payload (within the gimbal ball) about three axes (typical), namely elevation, roll, and azimuth. Courser adjustments are accomplished by moving the gimbal ball itself typically about the two outer axes, elevation and azimuth.

The cardan assembly includes a cardan shaft that spans the inside diameter of the ball. The center of the cardan shaft is used, in certain designs, to define the internal elevation axis.

Prior art designs place the cardan shaft so that it also aligns with the external axis. In particular, the internal elevation axis is set to align with the external elevation axis.

The instant invention is applicable for use with prior art designs and also with a newer offset cardan type of gimbal, as is described in an application filed for an Offset Cardan in the section, "Related Applications".

The sensor(s) is used to look at any given object(s) of interest, which is sometimes called a target(s). For example, the gimbal may be disposed in an airplane and it may be used for mapping terrain or for some other purpose. There may be a reference location that the gimbal must periodically slew to, perhaps to periodically coincide the area that is being mapped with a reference location or perhaps to periodically look for changes that might be occurring at the reference location. Then the gimbal must slew back to its original orientation to continue the mapping process. Ideally, this slewing action is preferably accomplished as quickly as possible.

This type of slewing typically occurs primarily along the azimuth axis. Smaller angular changes typically occur on the pitch and roll axes. Another common name applied to motion about the azimuth axis is "yaw". This is when an airplane, for example, moves left or right as controlled by its rudder. Such motion in an airplane is referred to as yaw and it occurs about the azimuth axis.

Because the payload has mass, the ability to slew quickly, especially about the azimuth axis, is related to the torque that is applied. A greater torque for any given configuration results in faster slew times, which is desirable.

There is another problem that limits the slew rate along the inner azimuth axis for a gimbal. The outer azimuth axis serves to keep a viewing window disposed in front of the sensor (i.e., camera) within its range of travel, which includes a greater range of travel than the inner axis. However, the inner axis must also slew as fast as the outer axis in order to prevent the limited rotation inner axis from exceeding its travel, that is to keep the sensor (camera) pointing at its intended target.

If the inner axis cannot accelerate as fast as the outer axis, the rate of slew for the inner axis will slow down and therefore limit the slew rate for the outer axis. This makes it especially important to be able to accelerate the inner axes as fast as possible.

Therefore it is desirable to speed up the inner rate of slew, primarily along the azimuth axis because that axis is where the greatest angular degree of motion and also where periodic changes in orientation often occur.

Another problem relates to the shaking of the payload during use of the gimbal. Isolators (i.e., any means to isolate the payload from the gimbal ball and the vehicle upon which the gimbal is itself mounted) are provided in virtually all high performance gimbals to isolate vibration and other changes in position of the vehicle, for example the airplane, apart from that of the payload (i.e., the sensors). The object is to minimize the sensor's vibration as it is pointed at the intended object of interest while the airplane vibrates, for example.

The isolators allow the payload to translate (i.e., move) within a given range of motion inside of the ball. Wide-gap motors provide a relatively wide space intermediate the magnets thereof with uniform magnetic flux. This allows space for the payload to move without impacting the magnet or any other part of the motor as the isolators translate.

It is important to understand that the internal axes provide finer corrections than do the external axes and accordingly, a smaller range of motion is therefore acceptable for the payload in the gimbal ball. Larger corrections are made by moving the entire gimbal ball relative to the vehicle upon which the gimbal itself is mounted.

It is useful to note that the cardan assembly may be used to support multiple types of sensors simultaneously as the payload. For example, a zoom television camera can be used for general spotting purposes and to locate an object of interest as well as for general pointing (i.e., aiming) of the gimbal. Upon locating the object of interest, a larger focal length camera can be used to more carefully study it. Accordingly, both types of cameras can be simultaneously mounted as part of the payload that is supported by the cardan assembly.

The payload may also be active instead of passive. A passive payload merely observes the object of interest whereas an active payload is adapted to affect it. The payload may be used to support an active component that can, for example, illuminate the object. For example, a gimbal can contain a source of illumination, such as a spotlight or a laser, and be mounted on, for example, a helicopter. Accordingly, as the helicopter hovers and fluctuates in its position relative to the object, the gimbal can be used to compensate for any movement by the helicopter in order to hold the source of illumination constantly upon the object.

If the source of illumination is a spotlight, then a larger physical payload capacity allows for a larger and brighter spotlight to be used. A larger payload typically increases the mass that is being carried which tends to slow down the rate of slewing. It is desirable to optimally locate as high a torque motor as possible which, all other factors being equal, allows for a greater payload mass and therefore increased utility for the gimbal.

Accordingly, there exists today a need for a cross plane wide-gap motor system for a gimbal that improves the aforementioned prior art limitations. In particular there is a need to step with high torque and allow good stability with the same motor arrangement simultaneously.

Clearly, such an apparatus would be useful and desirable.

2. Description of Prior Art

Gimbals are, in general, known. While the structural arrangements of the known types of devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is a first object of the invention to provide a cross plane wide-gap motor system for a gimbal that is adapted to slew from one azimuth location to another in the shortest practical time.

It is a second object of the invention to provide a cross plane wide-gap motor for gimbal that is adapted to hold the sensor(s) to a very low level of instability on three axes simultaneously.

It is a third object of the invention to provide a cross plane wide-gap motor for gimbal that is adapted to move a payload very smoothly while slewing.

It is a fourth object of the invention to provide a cross plane wide-gap motor for gimbal that is adapted to stabilize a gimbal payload.

It is a fifth object of the invention to provide a cross plane wide-gap motor for gimbal that is adapted to locate the motors for pitch roll and yaw as close to one plane as possible.

It is a sixth object of the invention to provide a cross plane wide-gap motor for gimbal that is adapted to provide balanced torque (i.e., pure moments) to the payload to affect angular accelerations, especially with an offset gimbal point.

It is a seventh object of the invention to provide a cross plane wide-gap motor for gimbal that is adapted to locate the motors as far from the center of rotation as possible to allow for higher torque.

It is an eight object of the invention to provide a cross plane wide-gap motor for gimbal that is adapted to locate the motors in a location that is not well utilized by sensors, thereby providing maximum useful volume for the payload.

It is a ninth object of the invention to provide a cross plane wide-gap motor for gimbal that is adapted to locate the magnets on either the gimbaled side or the outer side.

It is a tenth object of the invention to provide a cross plane wide-gap motor for a gimbal that includes motors that can be wired to operate in pairs.

It is an eleventh object of the invention to provide a cross plane wide-gap motor for gimbal motors that can be wired to operate as independent systems, each motor with its own amplifier to allow for optimum electronic tuning.

It is a twelfth object of the invention to provide a cross plane wide-gap motor for gimbal that is adapted to receive feedback from any type of a gyroscope (a.k.a. gyro) or IMU (inertial measurement unit) to increase stability.

It is a thirteenth object of the invention to provide a cross plane wide-gap motor for gimbal that is adapted to receive feedback from any type of a gyro or IMU to check and modify the force ratios in any of the motors so as to hold the sensor(s) to very low instability.

It is a fourteenth object of the invention to provide a cross plane wide-gap motor for gimbal that is adapted to increase gimbal acceleration rates.

It is a fifteenth object of the invention to provide a cross plane wide-gap motor for a gimbal that includes a three inner-axis system.

It is a sixteenth object of the invention to provide a cross plane wide-gap motor for a gimbal that is adapted to provide balanced torque (i.e., pure moments) directly to the inner axes of a gimbal, and reacts the torque directly on the outer axis structure.

It is a seventeenth object of the invention to provide a cross plane wide-gap motor for a gimbal that is adapted to include four coils that drive the azimuth axis to be configured so that a return winding intersects flux from an additional magnet set thereby increasing the azimuth torque for a given input electrical power.

It is an eighteenth object of the invention to provide a cross plane wide-gap motor for gimbal that is adapted to provide a configuration that is easy to manufacture.

Briefly, a cross plane wide-gap motor system for gimbals that is constructed in accordance with the principles of the present invention has a minimum of three wide-gap motors to control azimuth and pitch along the inner axes. A preferred configuration includes four two-axis wide gap motors that are disposed in opposite pairs on the same plane and preferably on the plane of the cardan and which are distally disposed maximally away from the axes that are being controlled. In particular, the four motors are disposed maximally away from the yaw (azimuth) axis and can each or all be simultaneously energized along either one or both of the two individual motor axes so as to produce balanced force vectors (i.e., pure torque) about three inner axes. The force vectors of all four motors combine to produce maximum balanced torque to move the payload about the yaw axis. By various combinations of energizing select axes of the four motors, motion about the pitch and roll axes is also accomplished. The motors include permanent magnets that can be disposed where desired in the ball. The preferred location is in motor pairs that are diametrically opposed with respect to each other and which are disposed maximally away from the yaw axis and on the cardan plane.

DETAILED DESCRIPTION OF THE INVENTION

Figure 1:
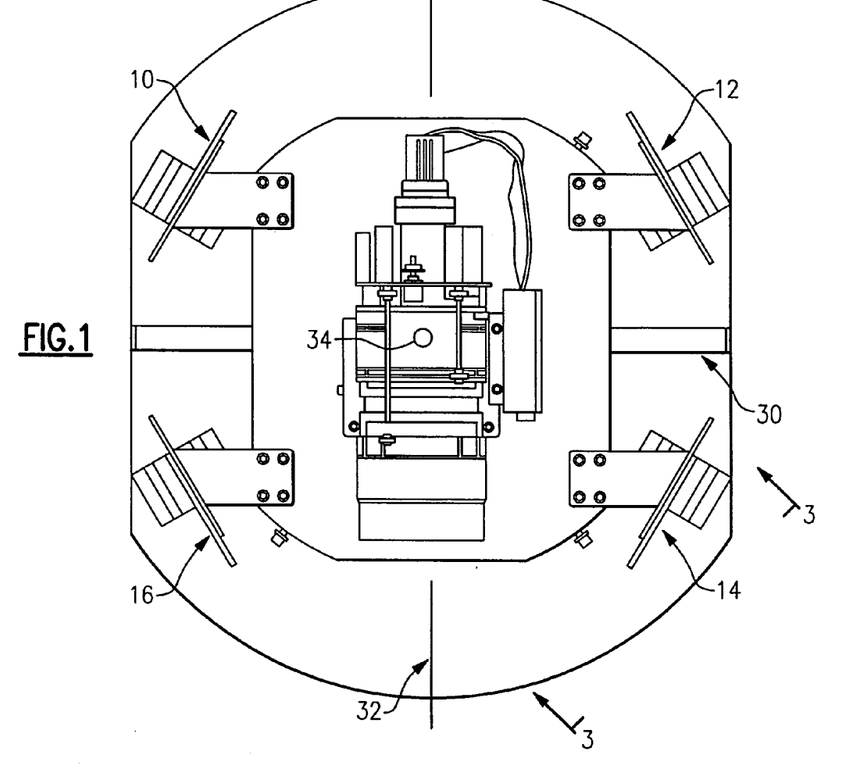
FIG. 1 is a top view of the inside of a gimbal ball.

Referring on occasion to all of the FIGURE drawings and in particular now to FIG. 1 is shown a gimbal having four cross plane wide-gap two-axis motors, identified in general by the reference numerals 10, 12, 14, and 16.

Figure 2:
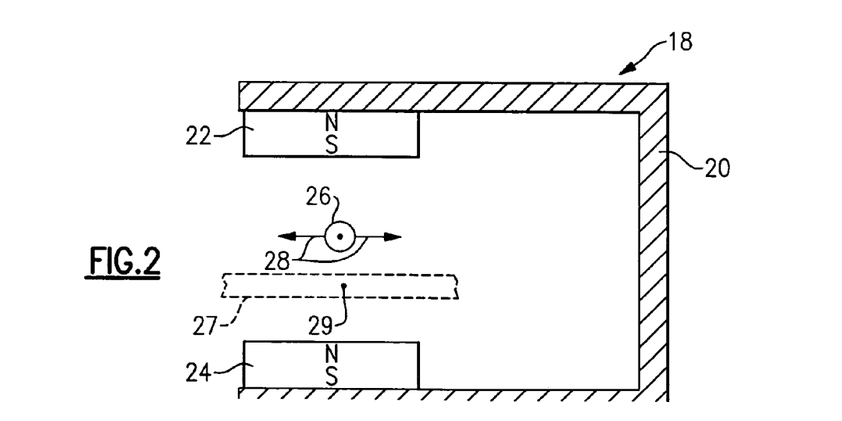
FIG. 2 is a single axis wide-gap motor.

Before a detailed description of the invention is provided, please refer to FIG. 2, where a single axis wide-gap motor, identified in general by the reference numeral 18 is shown. A frame 20 is used to secure two permanent magnets 22, 24 in an opposite orientation so as to produce optimum magnetic flux intermediate the two magnets 22, 24. As is well known in motor design, the frame 20 is preferably magnetically permeable to establish the optimum flux path.

Optimum flux means uniformly strong magnetic flux over as wide an area as possible.

A conductor 26 passes through the flux. The conductor 26, as shown, includes a longitudinal axis that is perpendicular with respect to the plane of the paper of drawing FIG. 2. When a current is passed through the conductor 26 a resultant force is applied to the conductor 26 which tends to urge the conductor along a first force vector 28, depending upon whether current is flowing into or out of the paper. The first force vector 28 is in a direction that is perpendicular to both the flux and current directions as is well known in motor design. Accordingly, a single axis wide gap motor 18 is provided.

For any given density of magnetic flux, the magnitude of current flow determines the magnitude of the first force vector 28. The direction of current flow determines the direction of the force, either to the left or right as shown.

In actual usage, a single conductor 26 is seldom used, but rather the conductor 26 may include a plurality of parallel windings, sometimes referred to as a "coil". The overall magnitude of current flow is then equal to a summation of the currents that are flowing through each of the parallel windings.

However, each of the actual motors 10–16 that are used is a dual axis motor, able to influence motion along either of two perpendicular force vectors. The two axes of motion for each motor 10–16 are provided by a perpendicular or nearly perpendicular orientation of two conductors disposed intermediate the magnets 22, 24, as is described in greater detail hereinafter.

Referring again to FIG. 2, is shown a portion of a second conductor 27 in dashed lines that is also disposed between the two magnets 22, 24. However the second conductor 27 is disposed at a right angle with respect to the conductor 26. Accordingly, when a current is passed through the second conductor 27, a second force vector 29 is generated. The direction of the second force vector 29, either in or out of the page, depends again on the direction of current flow through the second conductor 27.

Accordingly, a dual axis motor is provided. It is important to note that control of the current flow through the conductor 26 and the second conductor 27 are independently variable, therefore virtually infinite combinations of "resultant" torque and "resultant" direction of force are possible.

Figure 3:
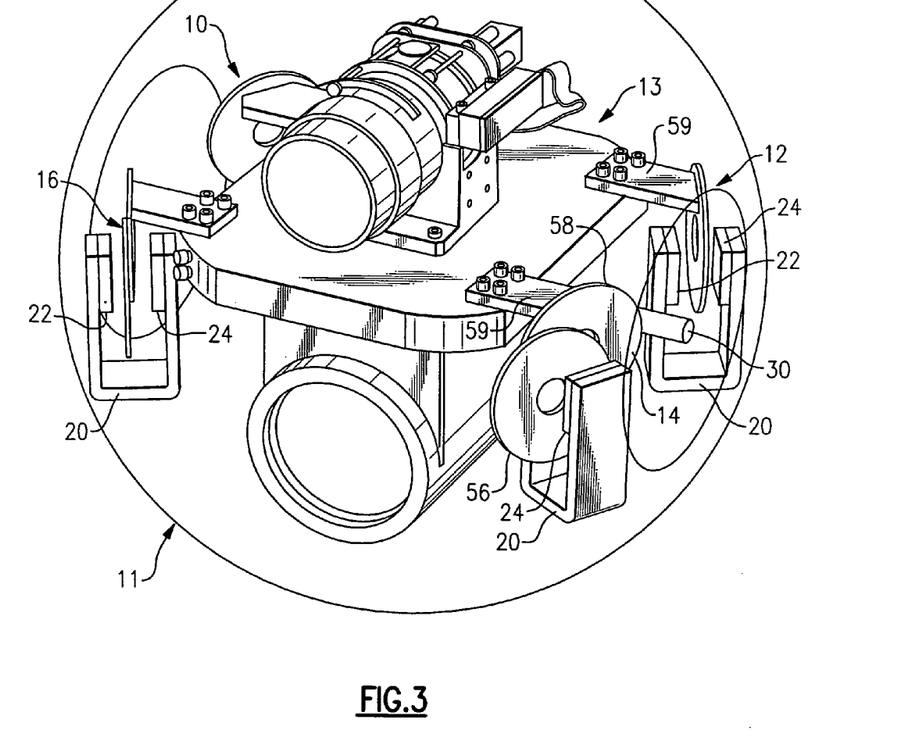
FIG. 3 is a view in perspective of the gimbal ball of FIG. 1, taken along the line 3—3.

The frame 20 for each motor 10–16 supports the magnets 22, 24 and is preferably attached mechanically to an inside of a gimbal ball, identified in general by the reference numeral 11 in FIG. 3. Each conductor 26, 27 is preferably mechanically attached to a payload, identified in general by the reference numeral 13 in FIG. 3. As the conductors 26, 27 in each motor 10–16 are urged to move, so is the payload 13 displaced.

There are various known ways of supporting the payload 13, for example, by the use of a cardan shaft 30 (FIG. 1) or a gimbal ring (not shown). The instant invention is adapted for all such uses. The important teaching is that current flow through the conductors 26, 27 of any one of the motors 10–16 is adapted to displace the payload 13 about either of two axes. When various combinations of the motors 10–16 are simultaneously energized with current flow, then motion about three axes is possible, as is described in greater detail hereinafter.

In summary, the magnitude of current flow for a given density of flux determines the magnitude of the force vector produced and the direction of current flow determines direction of the force vector. If it is desirable to increase the magnitude of force, then it is necessary to either increase the magnitude of current or the magnitude of the magnetic flux. Clearly, the magnets are permanently attached and cannot be added during normal use therefore leaving the control of current flow as the means to vary the magnitude of force. However, it is possible to add additional sets of permanent magnets, as is described in greater detail hereinafter. By varying the direction and magnitude of current flow through any or all of the conductors 26, 27 in any or all of the motors 10–16, the payload 13 can be displaced in any direction within the gimbal ball 11 over a limited range of motion (so as not to allow any of the conductors 26, 27 to make contact with any of the magnets 22, 24).

Referring in particular to the motor 14 of FIG. 3 a first conductor coil 56 and a second conductor coil 58 are perpendicular with respect to each other within the space that is disposed intermediate the magnets 22, 24. Therefore, when a current is applied to the first conductor coil 56 a first force vector is created and when a current is applied to the second conductor coil 58 a second force vector is created that is perpendicular with respect to the first force vector. Accordingly, the motor 14, which includes the two conductor coils 56, 58 also provides, with only the one set of permanent magnets 22, 24, a dual axis wide gap motor.

The conductor coils 56, 58 for each of the motors 10, 12, 14, 16 includes a plurality of conductors that are wound in substantially a parallel alignment so as to produce each coil. The conductor coils 56, 58 are in a substantially linear parallel orientation as disposed intermediate the magnets 22, 24, therefore the resultant force vector is a sum of the individual force vectors that are generated by each of the plurality of conductors within each of the conductor coils 56, 58.

The conductor coils 56, 58 for each motor 10–16 are supported by a bracket 59 that is mechanically attached to the payload 13. Therefore, as the conductor coils 56, 58 are urged to move, so is the payload 13 displaced. It is important to note that the motors 10–16 are arranged in opposite pairs [10 & 14; 12 & 16] that are disposed as far away as possible from a central yaw axis (reference numeral 34, FIG. 1) as is discussed in greater detail hereinafter. Also, the pairs of motors [10 & 14; 12 & 16] are disposed on the same plane.

Figure 4:
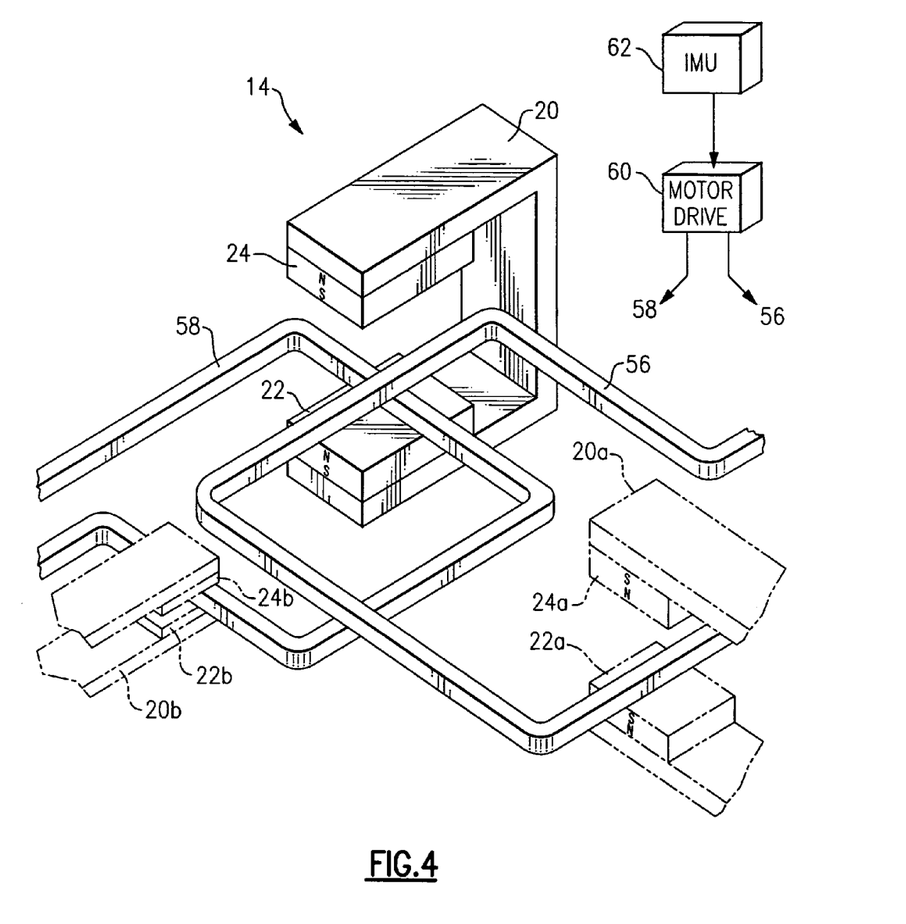
FIG. 4 is a dual axis wide-gap motor with two optional sets of torque increasing permanent magnets in dashed lines.

Referring momentarily now to FIG. 4, a perspective view of the construction of a dual axis motor (i.e., any of the motors 10–16) is shown. For purposes of illustration, let us assume that the motor 14 is shown.

The frame 20 supports the magnets 22, 24 and is attached to the gimbal ball 11 (not shown in this view). The conductor coils 56, 58 are positioned so that the conductor(s) within the coils 56, 58 are perpendicular with respect to each other in the space that is intermediate the magnets 22, 24 where the uniformly strong magnetic flux field is located. This orientation of the conductors in the coils 56, 58 is important only between the magnets 22, 24.

Clearly, the conductor coils 56, 58 are constructed so as to have the inherent strength necessary to transfer the forces they experience to the payload 13 without causing any damage to the mechanical integrity of the coils 56, 58.

When current flows through one of the conductor coils 56, a first force vector is generated. When current flows through the remaining one of the conductor coils 58, a second force vector is generated that is perpendicular with respect to the first force vector, the direction and magnitude of each being dependent upon the direction and magnitude of current flow through each conductor coil 56, 58.

A second set of magnets 22a, 24a is shown in dashed lines attached to an auxiliary bracket 20a. The second set of magnets 22a, 24a are disposed at an opposite end of the coil 56 where current is always flowing in an opposite physical direction than it is intermediate the magnets 22, 24.

The polarity of the second set of magnets 22a, 24a is opposite that of the magnets 22, 24. Therefore, because the magnetic field is reversed and because the direction of current flow is also reversed, the second set of magnets 22a, 24a increase the magnitude of the first force vector for any given magnitude of current flow that is occurring in the conductor coil 56. If the magnetic flux of the second set of magnets 22a, 24a is the same as that of the magnets 22, 24, then for any given current, the instantaneous force (i.e., torque) that is applied will be doubled.

This provides an even greater torque to move the payload 13. It is important to note that this increase in torque is accomplished without an increased expenditure of electrical current. While the apparent impedance also increases due to a back increase in EMF, this is experienced when the payload 13 is actually being displaced (i.e. when the payload 13 moves) relative to the magnets 22, 24 and to the second set of magnets 22a, 24a. The instantaneous benefit of the second set of magnets 22a, 24a is to provide an increase in torque.

As the motors 10–14 move the payload 13 only a small amount within the gimbal ball 11, the increase in torque is especially useful in maintaining optimum orientation of the payload 13 and also in providing rapid slewing, as well.

A third set of magnets 22b, 24b are attached to an additional auxiliary bracket 20b and are disposed on an opposite side of the remaining coil 58 with a polarity that is opposite that of the magnets 22, 24. Therefore, the third set of magnets 22b, 24b are also useful in increasing torque.

Referring back to FIG. 1, a cardan axis 30 is partially shown about which motion in pitch occurs. Motion in pitch is sometimes referred to as changes in elevation. As shown, motion in pitch is motion about the cardan axis 30, sometimes also referred to as a cardan shaft. If motors 10 and 12 are energized so as to provide a force vector that urges the end of the payload 13 nearest to motors 10 and 12 to move downward (i.e., into the paper) while a simultaneous force vector is applied to motors 14 and 16 that tends to urge the end of the payload 13 nearest motors 14 and 16 to move in an upward direction (i.e., out of the paper), motion in pitch is provided.

The direction of current through each conductor is reversed to pitch the payload in the opposite direction.

It is important to remember and note that motion of the inner axes typically provides for only about two degrees of motion to occur on either side of nominal. Courser motion is accomplished by the outer axes. Accordingly, the gap between the magnets 22, 24 and any of the remaining magnets must be sufficient to permit the required amount of inner axis motion to occur and to allow for motion of vibration isolators (not shown), if they are used.

The magnitude of current applied for movement of the payload 13 about any axis determines the torque that is produced, with a greater current producing a greater amount of torque (i.e., force).

A roll axis 32 is shown in dashed lines about which motion in roll occurs. If motors 12 and 14 are energized so as to provide a force vector that urges the side of the payload 13 nearest to motors 12 and 14 to move downward (i.e., into the paper) while a simultaneous force vector is applied to motors 10 and 16 that tends to urge the side of the payload 13 nearest motors 10 and 16 to move in an upward direction (i.e., out of the paper), motion in roll is provided.

Reversing the direction of current will reverse the direction of roll.

Clearly, control circuitry must be provided to control both the direction and magnitude of current in the conductors 26, 27 (i.e., in the conductor coils 56, 58) so as to obtain proper performance from the motors 10–16 resulting in proper movement and positioning of the payload 13.

There are many options for establishing the required control circuitry. If a roll axis is to be included in the design, a minimum of three drives are required, one each for pitch, roll, and azimuth.

It is possible to include a separate controller (i.e., drive circuit) for each axis of each motor, an example motor drive circuit 60 being shown in FIG. 4 for the motor 14 and which is discussed in greater detail hereinbelow.

The primary purpose is to optimally slew the gimbal ball 11 and to hold the payload 13 with optimum stability. The preferred reference for determining position is by the use of an inertial measurement unit, or IMU 62 (see FIG. 4). Current IMU 62 technology relies upon fiber optic gyroscopic technology, and is very accurate in detecting changes in orientation. The output signals from the IMU 62 are fed to the controllers (i.e., the motor drive circuits 60) to optimally move the payload 13, both along the "outer" and "inner" axes. The motor drive circuit 60, as shown, includes an output to energize (i.e., to control current direction and magnitude for) each of the conductor coils 56, 58 and is adapted to move the payload 13 along the inner axes in two directions.

Depending upon the intended application and the requirements for slew and stability, changes in the configuration of the controllers are anticipated to occur.

In general, the controllers include a high impedance source of current, the reason being to prevent induced voltage in the conductors from generating unwanted forces.

A yaw axis 34 is located in the center of the payload 13 and extends in a direction that is perpendicular with respect to the plane of the paper of FIG. 1. The yaw axis defines motion in azimuth.

Looking down on the payload (according to FIG. 1) if a force is simultaneously applied to the four motors 10–16 to urge the payload to move in a clockwise direction, then clockwise slewing in azimuth (about the yaw axis) is accomplished. Reversing the direction of current will result in counter-clockwise slewing in azimuth.

Referring now again to FIG. 3 and also on occasion to FIG. 1, the four motors 10–16 are disposed along the same plane. The ideal (preferred) plane for the four motors 10–16 is that of the cardan shaft 30 to provide the most balanced torque that is possible and in the simplest fashion. In the preferred embodiment the motors 10–16 are also disposed on opposite sides with respect to each other as was mentioned hereinabove, motor 10 being diametrically opposed from motor 14 and motor 12 being diametrically opposed from motor 16.

The cross plane limitation in the title refers to the orientation of the motors 10–16 so as to produce motion in the payload 13 about three axes. This cross plane arrangement (being on the same plane in opposite pairs) allows for the application of balanced torque (i.e., a pure torque) to be applied in any of the axes, with equal pushing and pulling occurring or with all motors pulling and pushing in the same direction. Balanced torque translates into a finer (i.e., a more precise) ability to control and make adjustments to the positioning of the payload 13 thereby improving stability. Testing of this configuration, even on a shaking table, has shown an ability to hold the sensors within 1 or 2 microradians of stability, a level of control which has not been previously attainable.

It is also noted that the motors 10–16 are all maximally disposed away from the yaw axis 34. There are a range of sizes of gimbal balls 11 for most applications, many between 17 and 21 inches in diameter. Regardless of the diameter of the ball 11, this configuration places the motors 10–16 as far from the center yaw axis as is physically possible. For any given force generated by the motors 10–16, this configuration ensures the generation of maximum torque, particularly in yaw (azimuth) where greater torque translates into a faster slew rate, which is highly desirable.

The magnets for each motor 10–16 (a minimum of one_ magnet for each motor is required, two magnets are preferable as shown) are stationary permanent magnets and they are attached to the gimbal ball 11, either to the inside of the ball 11 or to the outside of the ball 11, as desired. The ball 11 is essentially an enclosure that surrounds the component parts that are shown in the drawings and which is adapted for motion about two external axes, typically. It can be any shape although spherical is most common. The conductors 26, 27 for each motor 10–16 as mentioned hereinabove, are attached to the payload 13_ package, which is supported by the cardan shaft 30. Accordingly, motion of the conductors 26, 27 of each motor 10–16 is translated into motion of the payload 13 package relative to the gimbal ball 11.

The invention has been shown, described, and illustrated with reference to the presently preferred embodiments thereof. It will be understood by those skilled in this art that other and further changes and modifications may be made without departing from the spirit and scope of the invention which is define by the claims appended hereto.

What is claimed is:

1. A motor system adapted for use with a gimbal ball wherein said gimbal ball is supported by an outer axis structure that includes means for providing for the motion of said gimbal ball about an external elevation axis and about an external azimuth axis, comprising:

at least three motors that are separated with respect to each other, and wherein each of said motors is disposed proximate a common plane, said common plane passing through said gimbal ball, and wherein each of said motors is disposed in said gimbal ball away from a yaw axis of said gimbal ball, and wherein a portion of each of said motors is attached to said gimbal ball and a remaining portion thereof is attached to a payload that is disposed in said gimbal ball, and wherein each of said motors is adapted to displace said payload with respect to said gimbal ball, and wherein said portion of each of said motors that is attached to said gimbal ball is attached to an outer elevation drive thereof.

2. The motor system of claim 1 wherein said gimbal ball includes a cardan axis and wherein said cardan axis is disposed within said common plane.

3. The motor system of claim 2 wherein said cardan axis includes said means for providing for the motion of said payload about an internal elevation axis.

4. The motor system of claim 1 wherein said motors include permanent magnet magnetic torque motors.

5. The motor system of claim 4 wherein each of said permanent magnet magnetic torque motors includes a pair of permanent magnets that are disposed in a spaced apart relationship whereby a magnetic flux path is formed intermediate said pair of permanent magnets and wherein said portion of each of said motors that is attached to said gimbal ball includes said pair of permanent magnets, and wherein each of said permanent magnet magnetic torque motors includes a portion of a conductor that is disposed within said magnetic flux path and wherein said remaining portion thereof that is attached to a payload includes said conductor and wherein said payload is supported by a cardan shaft and wherein when a sufficient current is passed through said conductor, a force is experienced by said conductor that is sufficient to displace said payload with respect to said gimbal ball.

6. The motor system of claim 5 wherein each of said permanent magnet magnetic torque motors includes a second pair of permanent magnets that are disposed in a spaced apart relationship wherein a second magnetic flux path is formed intermediate said second pair of permanent magnets, and wherein each of said second pair of permanent magnets is attached to said gimbal ball, and wherein said conductor includes an extension that is disposed within said second magnetic flux path.

7. The motor system of claim 6 wherein said second pair of permanent magnets include a polarity that is opposite a polarity of said pair of permanent magnets and wherein said extension includes a direction of a current flow through said second magnetic flux path that is opposite a direction of said current flow through said magnetic flux path and wherein when a current is passed through said conductor, a second force is experienced by said extension and wherein said second force aligns with a direction of said first force that is simultaneously experienced by a portion of said conductor that is disposed in said magnetic flux path.

8. The motor system of claim 5 wherein said magnetic flux path that is formed intermediate said pair of permanent magnets includes a substantially uniform magnetic field.

9. The motor system of claim 8 wherein magnetic flux path that is formed intermediate said pair of permanent magnets includes a distance that is sufficient to permit the movement of said conductor therein.

10. The motor system of claim 9 wherein said distance is sufficient to permit the movement of said conductor sufficient to displace said payload at least two degrees of arc.

11. The motor system of claim 9 wherein said distance is sufficient to permit the movement of said conductor sufficient to displace said payload in said gimbal ball in roll.

12. The motor system of claim 9 wherein said distance is sufficient to permit the movement of said conductor sufficient to displace said payload in said gimbal ball in pitch.

13. The motor system of claim 9 wherein said distance is sufficient to permit the movement of said conductor sufficient to displace said payload in said gimbal ball in yaw.

14. The motor system of claim 5 including means for providing a reference sufficient to sense a position of said payload.

15. The motor system of claim 14 wherein said means for providing a reference includes an inertial measurement unit.

16. The motor system of claim 15 wherein said inertial measurement unit is configured to provide a signal to a control circuit, and wherein said control circuit is adapted to generate a current through said conductor in any of said plurality of motors that is sufficient to displace said payload.

17. The motor system of claim 16 wherein said control circuit is adapted to determine from said signal a magnitude of error and a direction away from a preferred direction that said payload is oriented, and wherein said control circuit is adapted to generate a current through said conductor in any of said motors that is sufficient to provide a correction thereof.

18. The motor system of claim 17 wherein said control circuit is adapted to generate a current simultaneously through a plurality of said conductors in at least two of said motors that is sufficient to provide a correction thereof.

19. The motor system of claim 5 wherein said magnetic torque motors include four magnetic torque motors.

20. The motor system of claim 19 wherein each of said four magnetic torque motors is adapted to displace said conductors along two perpendicular axes.

21. The motor system of claim 20 wherein said two perpendicular axes are adapted to urge said payload about a roll, pitch, and yaw axis.

22. The motor system of claim 19 wherein two of said four magnetic torque motors are disposed in a pair, said pair being disposed in a maximally spaced-apart orientation and on an opposite side of said gimbal ball, whereby a balanced torque is applied to said payload when an equal magnitude force is applied to each motor of said pair.

23. The motor system of claim 5 wherein each of said magnetic torque motors includes a second pair of permanent magnets that are disposed in a spaced apart relationship and parallel with respect to said pair of permanent magnets and wherein a second magnetic flux path is formed intermediate said second pair of permanent magnets, and wherein each of said second pair of permanent magnets is attached to said gimbal ball, and wherein said conductor includes an extension that is disposed within said second magnetic flux path, and wherein subsequent to said sufficient current being applied through said conductor, a first force vector is generated by said pair of permanent magnets and is applied to said conductor and wherein a second force vector is generated by said second pair of permanent magnets and is applied to said conductor and wherein said first force vector is additive with respect to said second force vector.

24. A method for increasing the rate of slew for a yaw axis of a gimbal, including the steps of:
(a) providing a motor system adapted for use with a gimbal ball wherein said gimbal ball is supported by an outer axis structure that includes means for providing for the motion of said gimbal ball about an external elevation axis and about an external azimuth axis, and including at least three motors that are oppositely disposed with respect to each other, and wherein each of said motors is disposed proximate a common plane, said common plane passing through said gimbal ball, and wherein each of said motors is disposed in said gimbal ball distally away from a yaw axis of said gimbal ball, and wherein a portion of each of said motors is attached to said gimbal ball and a remaining portion thereof is attached to a payload that is disposed in said gimbal ball, and wherein each of said motors is adapted to displace said payload about said yaw axis with respect to said gimbal ball, and attaching a first half of each of said at least three motors to an outer elevation axis of said gimbal ball and attaching a remaining half of each of said at least three motors to a payload; and
(b) slewing said gimbal ball about said yaw axis.

25. A motor system adapted for use with a gimbal ball wherein said gimbal ball is supported by an outer axis structure that includes means for providing for the motion of said gimbal ball about an external elevation axis and about an external azimuth axis, comprising:
at least three motors that are separated with respect to each other, and wherein each of said motors is disposed proximate a common plane, said common plane passing through said gimbal ball, and wherein each of said motors is disposed in said gimbal ball away from a yaw axis of said gimbal ball, and wherein a portion of each of said motors is attached to said gimbal ball and a remaining portion thereof is attached to a payload that is disposed in said gimbal ball, and wherein each of said motors is adapted to displace said payload with respect to said gimbal ball and wherein said motors include permanent magnet magnetic torque motors, and wherein each of said permanent magnet magnetic torque motors includes a pair of permanent magnets that are disposed in a spaced apart relationship whereby a magnetic flux path is formed intermediate said pair of permanent magnets and wherein said portion of each of said motors that is attached to said gimbal ball includes said pair of permanent magnets, and wherein each of said permanent magnet magnetic torque motors includes a portion of a conductor that is disposed within said magnetic flux path and wherein said remaining portion thereof that is attached to a payload includes said conductor and wherein said payload is supported by a cardan shaft and wherein when a sufficient current is passed through said conductor, a force is experienced by said conductor that is sufficient to displace said payload with respect to said gimbal ball, and wherein each of said permanent magnet magnetic torque motors includes a second pair of permanent magnets that are disposed in a spaced apart relationship wherein a second magnetic flux path is formed intermediate said second pair of permanent magnets, and wherein each of said second pair of permanent magnets is attached to said gimbal ball, and wherein said conductor includes an extension that is disposed within said second magnetic flux path.

26. The motor system of claim 25 wherein said second pair of permanent magnets include a polarity that is opposite a polarity of said pair of permanent magnets and wherein said extension includes a direction of a current flow through said second magnetic flux path that is opposite a direction of said current flow through said magnetic flux path and wherein when a current is passed through said conductor, a second force is experienced by said extension and wherein said second force aligns with a direction of said first force that is simultaneously experienced by a portion of said conductor that is disposed in said magnetic flux path.

27. A motor system adapted for use with a gimbal ball wherein said gimbal ball is supported by an outer axis structure that includes means for providing for the motion of said gimbal ball about an external elevation axis and about an external azimuth axis, comprising:

at least three motors that are separated with respect to each other, and wherein each of said motors is disposed proximate a common plane, said common plane passing through said gimbal ball, and wherein each of said motors is disposed in said gimbal ball away from a yaw axis of said gimbal ball, and wherein a portion of each of said motors is attached to said gimbal ball and a remaining portion thereof is attached to a payload that is disposed in said gimbal ball, and wherein each of said motors is adapted to displace said payload with respect to said gimbal ball, and 1 wherein said motors include permanent magnet magnetic torque motors, and wherein each of said permanent magnet magnetic torque motors includes a pair of permanent magnets that are disposed in a spaced apart relationship whereby a magnetic flux path is formed intermediate said pair of permanent magnets and wherein said portion of each of said motors that is attached to said gimbal ball includes said pair of permanent magnets, and wherein each of said permanent magnet magnetic torque motors includes a portion of a conductor that is disposed within said magnetic flux path and wherein said remaining portion thereof that is attached to a payload includes said conductor and wherein said payload is supported by a cardan shaft and wherein when a sufficient current is passed through said conductor, a force is experienced by said conductor that is sufficient to displace said payload with respect to said gimbal ball, and wherein said magnetic torque motors include four permanent magnet magnetic torque motors, and wherein two of said four permanent magnet magnetic torque motors are disposed in a pair, said pair being disposed in a maximally spaced-apart orientation and on an opposite side of said gimbal ball, whereby a balanced torque is applied to said payload when an equal magnitude force is applied to each motor of said pair.

28. A motor system adapted for use with a gimbal ball wherein said gimbal ball is supported by an outer axis structure that includes means for providing for the motion of said gimbal ball about an external elevation axis and about an external azimuth axis, comprising:

at least three motors that are separated with respect to each other, and wherein each of said motors is disposed proximate a common plane, said common plane passing through said gimbal ball, and wherein each of said motors is disposed in said gimbal ball away from a yaw axis of said gimbal ball, and wherein a portion of each of said motors is attached to said gimbal ball and a remaining portion thereof is attached to a payload that is disposed in said gimbal ball, and wherein each of said motors is adapted to displace said payload with respect to said gimbal ball, and wherein said motors include permanent magnet magnetic torque motors, and wherein each of said permanent magnet magnetic torque motors includes a pair of permanent magnets that are disposed in a spaced apart relationship whereby a magnetic flux path is formed intermediate said pair of permanent magnets and wherein said portion of each of said motors that is attached to said gimbal ball includes said pair of permanent magnets, and wherein each of said permanent magnet magnetic torque motors includes a portion of a conductor that is disposed within said magnetic flux path and wherein said remaining portion thereof that is attached to a payload includes said conductor and wherein said payload is supported by a cardan shaft and wherein when a sufficient current is passed through said conductor, a force is experienced by said conductor that is sufficient to displace said payload with respect to said gimbal ball, and wherein each of said permanent magnet magnetic torque motors includes a second pair of permanent magnets that are disposed in a spaced apart relationship and parallel with respect to said pair of permanent magnets and wherein a second magnetic flux path is formed intermediate said second pair of permanent magnets, and wherein each of said second pair of permanent magnets is attached to said gimbal ball, and wherein said conductor includes an extension that is disposed within said second magnetic flux path, and wherein subsequent to said sufficient current being applied through said conductor, a first force vector is generated by said pair of permanent magnets and is applied to said conductor and wherein a second force vector is generated by said second pair of permanent magnets and is applied to said conductor and wherein said first force vector is additive with respect to said second force vector.

* * * * *